United States Patent [19]
Vendetti et al.

[11] Patent Number: 5,295,180
[45] Date of Patent: Mar. 15, 1994

[54] CELLULAR TELEPHONE ZONE SYSTEM

[75] Inventors: Dino J. Vendetti, Issaquah, Wash.;
Don H. Atherly, Beaverton, Oreg.;
Ching Chuang, Issaquah, Wash.;
Elliott H. Drucker, Kirkland, Wash.;
Michael J. Dunn, Issaquah, Wash.;
Ronald E. Foerster, Bellevue, Wash.;
David G. Schoenmaker, Carnation, Wash.

[73] Assignee: U S West NewVector Group, Inc., Bellevue, Wash.

[21] Appl. No.: 865,090

[22] Filed: Apr. 8, 1992

[51] Int. Cl.$^5$ .................... H04M 11/00; H04Q 7/00
[52] U.S. Cl. ........................ 379/59; 379/60; 455/33.1; 455/33.4
[58] Field of Search ............ 379/59, 60; 455/33.1, 455/33.2, 54.1, 33.4, 56.1

[56] References Cited

U.S. PATENT DOCUMENTS

| | | | |
|---|---|---|---|
| 4,475,010 | 10/1984 | Huensch et al. | 379/60 |
| 4,669,107 | 5/1987 | Eriksson | 379/60 |
| 4,876,738 | 10/1989 | Selby | 379/59 |
| 4,947,452 | 8/1990 | Hattori | 455/33.4 |
| 5,040,238 | 8/1991 | Comroe et al. | 455/33.4 |
| 5,063,591 | 11/1991 | Jodoin | 379/60 |
| 5,093,925 | 3/1992 | Chanroo | 379/59 |
| 5,097,499 | 3/1992 | Cosentino | 379/59 |
| 5,101,501 | 3/1992 | Gilhousen et al. | 379/60 |
| 5,179,721 | 1/1993 | Comroe et al. | 379/59 |

FOREIGN PATENT DOCUMENTS

| | | | |
|---|---|---|---|
| 0143725 | 6/1990 | Japan | 455/33.1 |
| 0158028 | 7/1991 | Japan | 455/33.4 |

OTHER PUBLICATIONS

Jansson et al., "The Future of Cellular Telephony," *Ericsson Review*, No. 1, 1990, vol. 67, pp. 49–50.
Whitehead, "Cellular System Design; An Emerging Engineering Discipline," *IEEE Communications Magazine*, Feb. 1987, vol. 24, No. 2, pp. 8–15.

*Primary Examiner*—Stephen Chin
*Assistant Examiner*—Vijay Shankar
*Attorney, Agent, or Firm*—Timothy R. Schulte

[57] ABSTRACT

A system for marking a plurality of zones within a cellular service area. One or more marker transmitters are disposed throughout a cellular area to transmit a zone identification signal that is independent of normal RF cellular coverage to a mobile or portable cellular receiver. Each zone identification signal is transmitted in a radio frequency coverage area that illuminates the zone to be identified and is constrained by a similar transmitter jamming the zone signal. The marker transmitters are programmed to transmit the zone identification signal during a predefined time slot so that more than one marker transmitter may simultaneously transmit the zone identification signal, thereby increasing the area in which the zone identification signal can be received by the mobile unit. In order to reduce the area in which a zone identification signal may be received by a mobile unit, the marker transmitters may transmit a jamming signal at the same time as the zone identification signal is transmitted.

34 Claims, 11 Drawing Sheets

CELLULAR TELEPHONE ZONE SYSTEM

FIELD OF THE INVENTION

The present invention relates generally to cellular telephone communication systems and, in particular, to a system for dividing a cellular telephone service area into a plurality of zones.

BACKGROUND OF THE INVENTION

Due to relatively low cost and advancements in cellular radio technology, most metropolitan areas are now equipped with cellular telephone networks, similar to the system shown in FIG. 1.

The cellular telephone system 10 includes a mobile telephone switching office (MTSO) 12 and a plurality of cell site transceivers 14a-14c. The cell site transceivers transmit radio signals to and receive radio signals from one or more mobile units 16 that may move about a cellular service area 20. A mobile unit, as the term is used herein, refers to a cellular voice telephone or data receiver that can be permanently installed at a fixed location or within a vehicle or that can be portable. Each cell site transceiver 14 is able to broadcast and receive the radio signals within a geographic area 18 called the cell site coverage area. Together the areas 18 comprise the entire cellular service area 20. Typically, a cellular service area comprises a metropolitan area or larger region.

When a telephone call to a called mobile unit 16 originates from either another mobile unit or a land-based telephone via a public switched telephone network (PSTN) 25, a caller must first access the cellular telephone system 10. This is accomplished by dialing the mobile unit's unique identification number (i.e., its phone number). The MTSO 12 receives such a call request, and instructs a central call processor 17 to begin call processing. The central call processor 17 transmits a signal over a dedicated line 19 (such as a telephone line or microwave link, etc.) to each of the cell site transceivers 14a-14c causing the cell site transceivers to transmit a page signal that locates the mobile unit 16. The page signal alerts a particular mobile unit 16 that it is being called by including as part of the page signal the paged mobile unit's identification or phone number.

Each cell site transceiver 14 transmits the page signal on one or more dedicated forward control channels that carry all pages, as well as control signals, channel assignments, and other overhead messages to each mobile unit. The forward control channel is distinct from the voice channels that actually carry voice communications between a mobile unit and another mobile unit or a land-based telephone. Each cell site transceiver may have more than one forward control channel upon which pages can be carried. For clarity, however, this discussion will assume that each cell site transceiver has one forward control channel.

When a mobile unit is not engaged in a telephone call, it operates in an idle state. In the idle state, the mobile unit will tune to the strongest available forward control channel and monitor that channel for a page signal or other messages directed to it. Upon determining that a page signal is being transmitted, the mobile unit 16 again scans all forward control channels so as to select the cell site transceiver transmitting the strongest signal. The mobile unit then transmits an acknowledgment signal to the cell site transceiver over a reverse control channel associated with the strongest forward control channel. This acknowledgment signal serves to indicate to the MTSO 12 which of the several forward control channels (associated with the several cell site transceivers 14a-14c) to use for further call processing communications with mobile unit 16. This further communication typically includes a message sent to the mobile unit instructing it to tune to a particular voice channel for completion of call processing and for connection with the calling party. The details of how the cell site transceivers transmit the signals on the forward and reverse control channels are typically governed by standard protocols such as the EIA/TIA-553 Specification and the air interface standards for Narrow Band Analog Mobile Phone Service (NAMPS) and similar air interface standards for digital communications, all of which are well known to those of ordinary skill in the cellular telephone communications art and therefore will not be discussed.

While cellular phones have been quickly embraced by those people whose business requires them to travel frequently and to be in constant contact with their clients, many individuals are discouraged from utilizing present cellular telephone systems. The main reason for this discouragement is the relatively high price charged by the cellular service providers for a cellular telephone call. In conventional land-based telephone systems, the price of a telephone call can be tailored to reflect the supply and demand of the telephone resources available to a given area. For example, in large metropolitan areas or financial districts where telephone traffic and the cost of providing service is high, users can expect to pay more for a call than in a residential area where fewer calls are made. However, with current cellular technology, like the cellular telephone system shown in FIG. 1, the cellular service user has no way of knowing where in the cellular service area the user is. Therefore, cellular service providers have had difficulty creating services that require a user to know his location within the cellular service area.

Consequently, a need has developed to provide a system that allows a user to determine whether he is in a particular predefined zone within the cellular service area and to convey that information to the cellular service system. It is further desirable that such a system be compatible with existing cellular technology and should not degrade the operation of an existing cellular system. Finally, such a system should neither require the allocation of more radio frequencies than are currently allocated to cellular telephone systems, nor require a substantial portion of existing cellular frequencies.

SUMMARY OF THE INVENTION

According to the present invention a system for marking a predefined zone within a cellular service area and for determining whether a mobile unit is in a particular zone is disclosed. The system comprises a plurality of marker transmitters located throughout the cellular service area. A marker signal is transmitted by one or more marker transmitters such that the marker signal can be received by a mobile unit in a radio frequency coverage area that is substantially coincident with the boundaries of the zone. Included in the marker signals are zone identification signals that are unique to each zone in the cellular service area. The mobile unit is preprogrammed with the zone identification signal for one or more particular preselected zones. Each mobile unit monitors a marker channel to receive the marker signals transmitted by the marker transmitters. If the mobile unit receives the zone identification signals for the particular preselected zones, an indication of such status is provided to the user. Additionally, upon call initiation, a signal is transmitted to the cellular service system that indicates the mobile unit is in zone.

According to another aspect of the present invention the marker signals include a synchronizing code that allows a mobile unit to synchronize itself with a series of time slots within which data is transmitted by the plurality of marker transmitters.

According to yet another aspect of the present invention, the marker transmitters may transmit a jamming signal during the time slot when a zone identification signal is being transmitted by another marker transmitter to further shape the radio frequency coverage area in which the zone identification signal can be received by the mobile unit. The power level at which the marker transmitters transmit the zone identification signals and jamming signals can also be varied to shape the radio frequency coverage area. A zone computer is coupled to each of the marker transmitters via a communication link to control the power level at which the marker transmitters transmit.

In yet another aspect of the present invention, the marker transmitters also transmit a variable password that is unique to the particular zone. The mobile unit transmits the password back to the cellular system where the password received from the mobile unit is compared with the password transmitted by the marker transmitters. If the passwords are the same, the cellular service provider can be confident that the mobile unit is within a particular zone. By using the variable passwords, fraudulent use of the zone marking system is restricted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
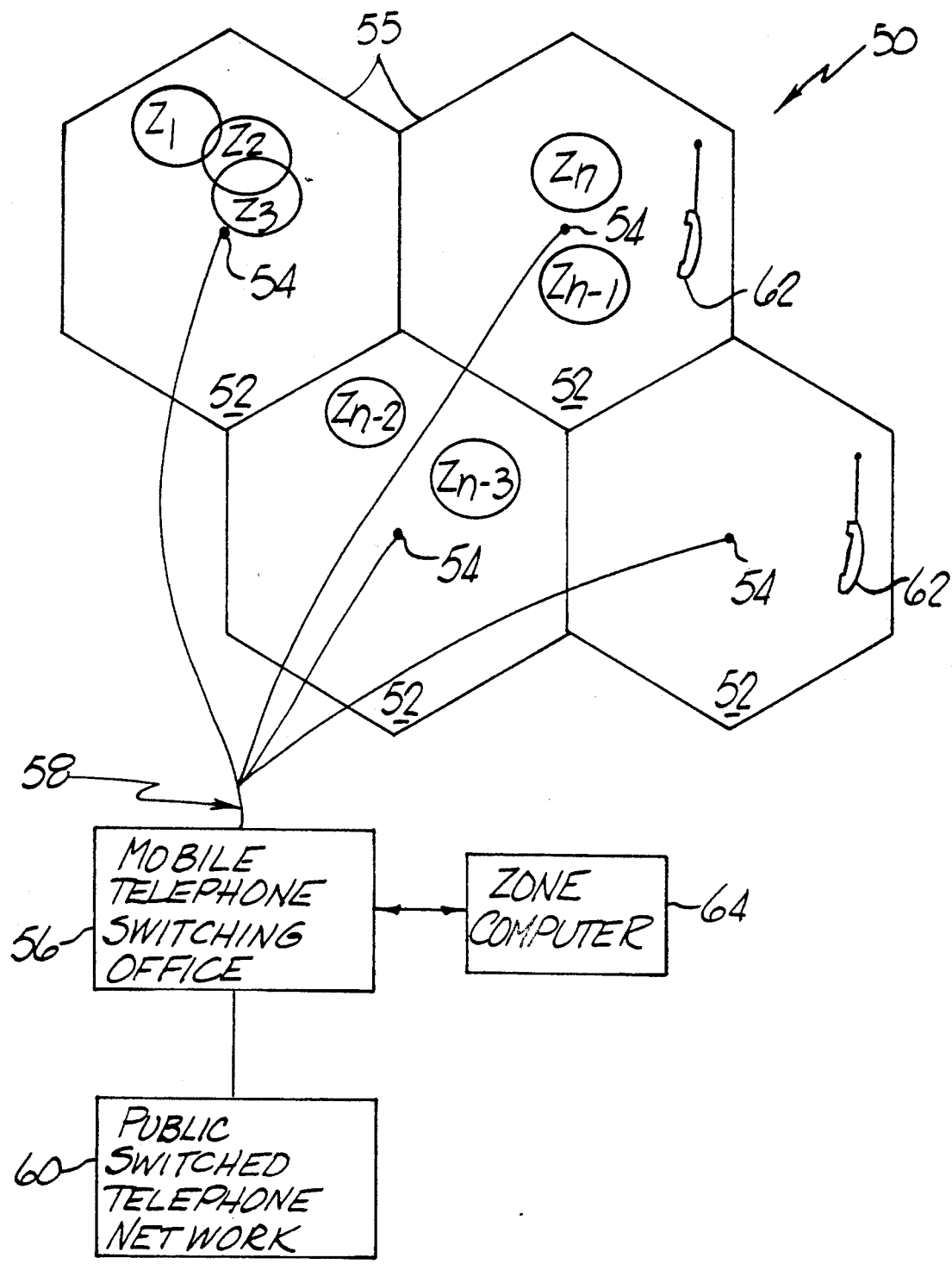
FIG. 2 is a diagram of a cellular telephone system according to the present invention.

FIG. 2 is a diagram of a preferred embodiment of a cellular telephone system 50 according to the present invention. The cellular telephone system 50 comprises a plurality of cell site coverage areas 52 each of which is serviced by cell site transceiver 54. Together, the cell site coverage areas 52 define the cellular service area 55. The cell site transceivers are connected to a mobile telephone switching office (MTSO) 56 by a plurality of dedicated communication links 58 such as telephone lines, microwave links, etc. The MTSO 56 interfaces with a public switched telephone network 60 to handle telephone calls to and from a plurality of mobile units 62 within the cellular service area.

Figure 1:
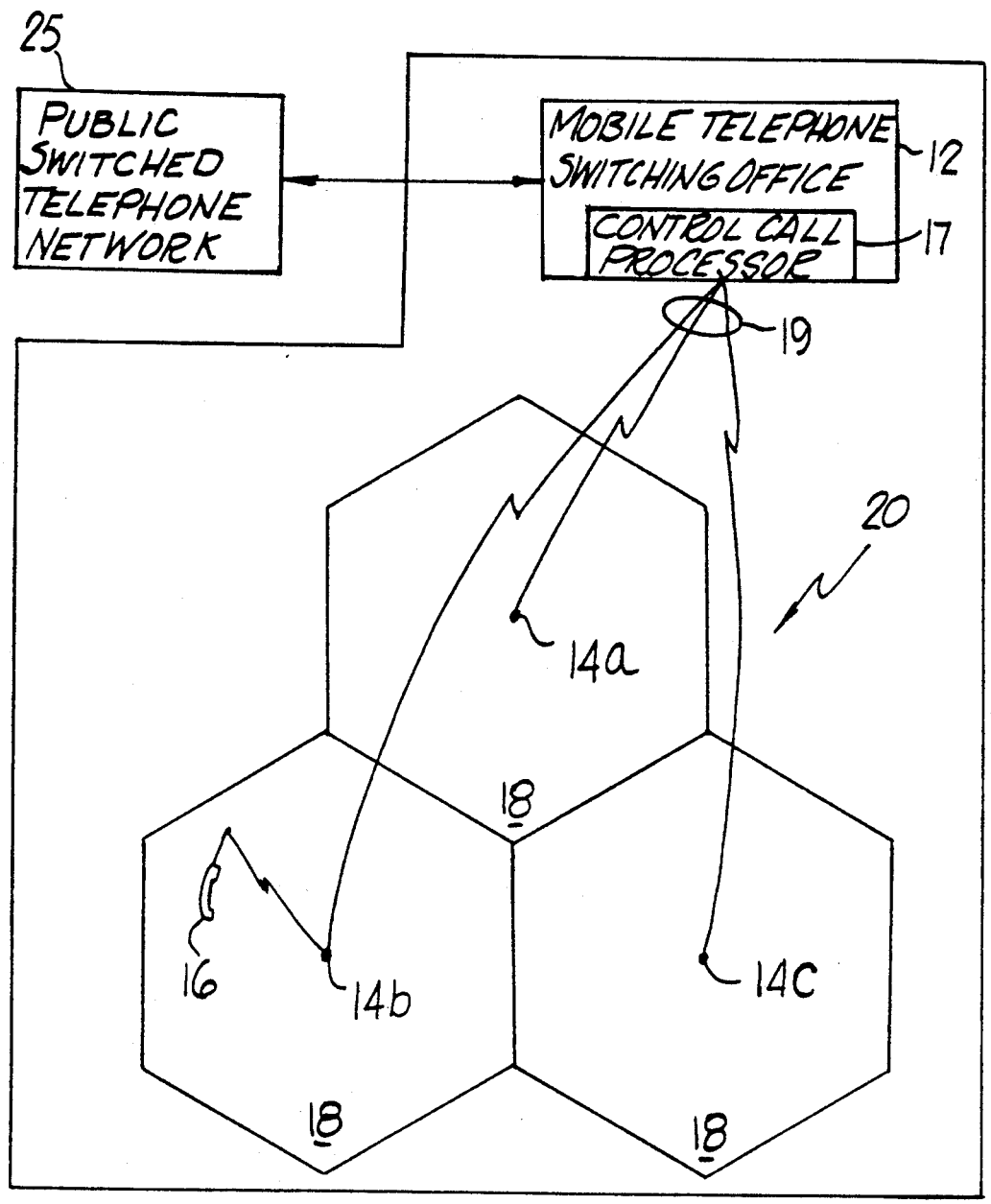
FIG. 1 is a diagram of a cellular telephone system according to the prior art.

A major difference between the cellular telephone system 50 and the cellular telephone systems of the prior art (shown in FIG. 1) is the division of the cellular service area 55 into a number of zones $Z_1$, $Z_2$, $Z_3$, ... $Z_n$. These zones may be located in separate geographic areas or may overlap partially or completely. The zone may be larger or smaller than a cell site coverage area 52. However, each zone typically has a diameter of approximately five miles.

The cellular telephone system 50 according to the present invention allows the user of a mobile unit 62 to contract with the cellular service provider that operates the cellular telephone system in order to select one of the plurality of zones as a "primary" zone. Each time the mobile unit 62 makes or receives a telephone call within the primary zone, the user is billed according to a rate schedule set for that particular zone. For example, assuming the user of mobile unit 62 has elected zone $Z_1$ as the primary zone, then each time the mobile unit 62 places or receives a telephone call, a determination is made whether the unit is within the boundaries of zone $Z_1$. If the mobile unit is within zone $Z_1$, an indication is provided to the user so that he knows he is in his primary zone. If, while in the primary zone, the user initiates or receives a telephone call, a signal is transmitted to the MTSO 56 and the user is billed for the call at a rate set for that particular zone. For example, the cellular service provider may wish to give a user a discount for calls made within the zone $Z_1$ and charge a premium for calls made outside the zone $Z_1$. On the other hand, if zone $Z_1$ is located in a high density area, a user may be charged a premium rate for making or receiving calls within the zone.

The cellular telephone system according to the present invention also allows a user to select one or more "secondary" zones. In addition to checking to see if the mobile unit is within its primary zone, the mobile unit checks to see if it is in one of its secondary zones. If the unit is within a secondary zone at the time of call initiation, a signal is transmitted to the MTSO and the user is billed at a "secondary zone" rate. Additionally, the cellular service area may contain several "public zones" in such areas as airports or shopping malls. The mobile units of the present invention can also determine if they are located in a public zone and, if so, are billed for calls made in a public zone at a "public zone" rate. In any event, one purpose of the cellular telephone system 50 according to the present invention is to be able to provide an indication to the user of the mobile unit 62, and to the MTSO 56, whether the user is inside or outside the boundaries of a particular zone—subject to the limitations of radio frequency propagation characteristics.

Figure 3:
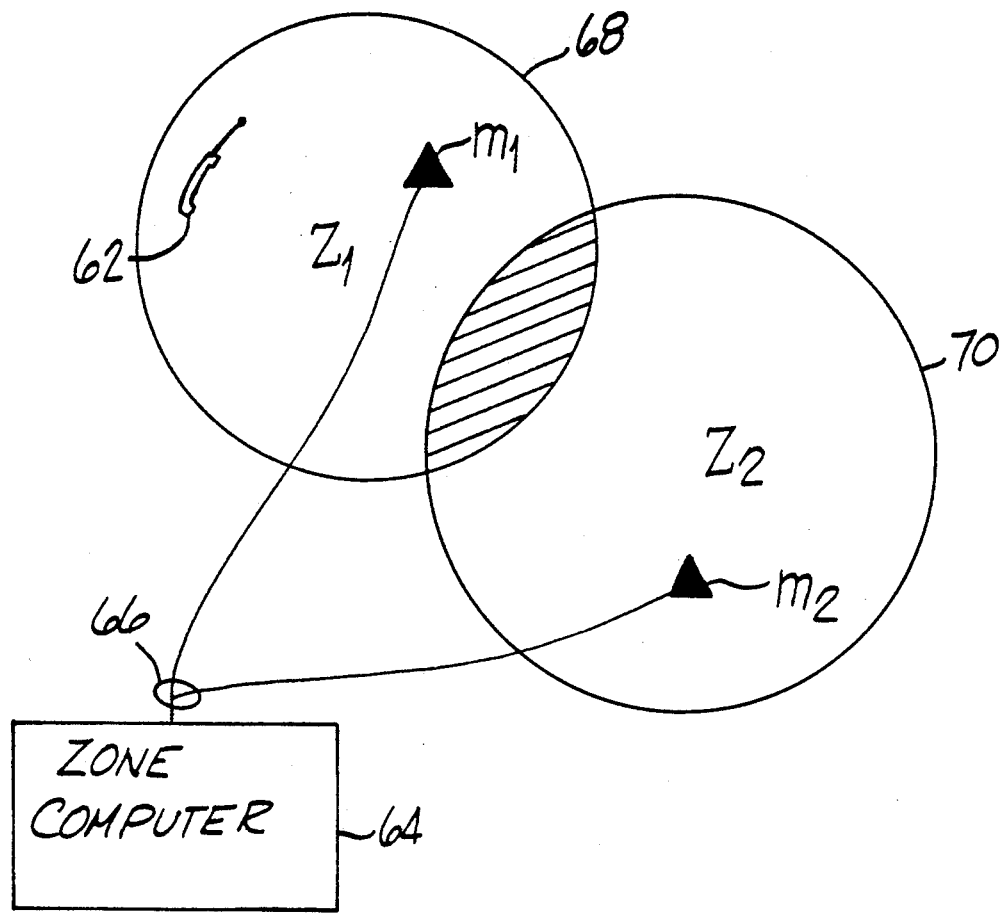
FIG. 3 is a detailed diagram of a pair of adjacent zones that are marked by a pair of marker channel transmitters according to the present invention.

FIG. 3 shows a pair of zones $Z_1$ and $Z_2$ included within the cellular service area 55 shown in FIG. 2. In the most simple case, a pair of marker channel transmitters $M_1$ and $M_2$ (marker transmitters) transmit marker signals on a common, dedicated 30 kHz cellular traffic channel or portion thereof. The marker channel is selected from the total set of cellular traffic channels for the cellular service area. The marker signals allow the mobile unit 62 to determine whether the unit is within a particular zone. The marker transmitters $M_1$ and $M_2$ are interfaced with a zone computer 64 via a communication link 66 such as a telephone line or microwave link.

Assume, for example, that the owner of the mobile unit 62 has contracted with the cellular service provider to select zone $Z_1$ as a primary zone and zone $Z_2$ as a secondary zone. The mobile unit will then attempt to determine if it is in one of these zones by periodically monitoring the marker signals transmitted on the marker channel. If the mobile unit detects that it is within zone $Z_1$, then the user will be billed at the primary zone rate for any calls made within the zone. Similarly, if the mobile unit detects that it is within zone $Z_2$, the user will be billed for any calls made within zone $Z_2$ at the secondary zone rate. If the mobile unit detects that it is within both zone $Z_1$ and zone $Z_2$ (shown as the shaded area), the mobile unit decides which zone it is in according to a set of predetermined rules. For example, the rules may direct the mobile unit to choose a primary zone over a secondary zone, so that a mobile unit detecting that it is in both zones would designate itself to be in its primary zone. Other priority conditions may also be implemented.

The signal transmitted by the mobile unit that indicates the mobile unit is within a zone comprises the zone identification signal and a password for the particular zone so designated. Additionally, a "zone type code" may be transmitted that indicates to the MTSO whether the unit is in its primary, secondary or a public zone. These signals are transmitted in addition to the mobile unit's phone number which is transmitted to the MTSO under the current cellular communications protocol. Therefore the MTSO is able to determine which mobile unit is sending the signal, which zone the mobile unit is in and what password the mobile unit has received for the zone. With this data, the rate charged to the user can be varied based on the mobile units location within the zone.

Figure 4A:
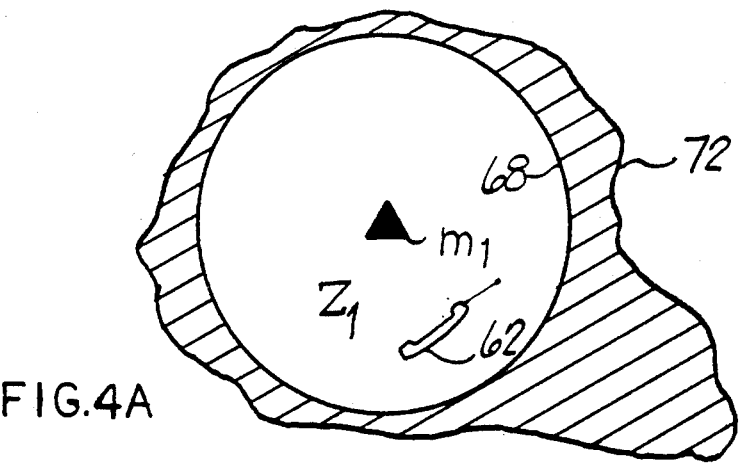
FIGS. 4A, 4B and 4C illustrate how a marker transmitter is used to mark a zone and how the radio frequency coverage area of a marker channel transmitter can be fine tuned.
Figure 5:
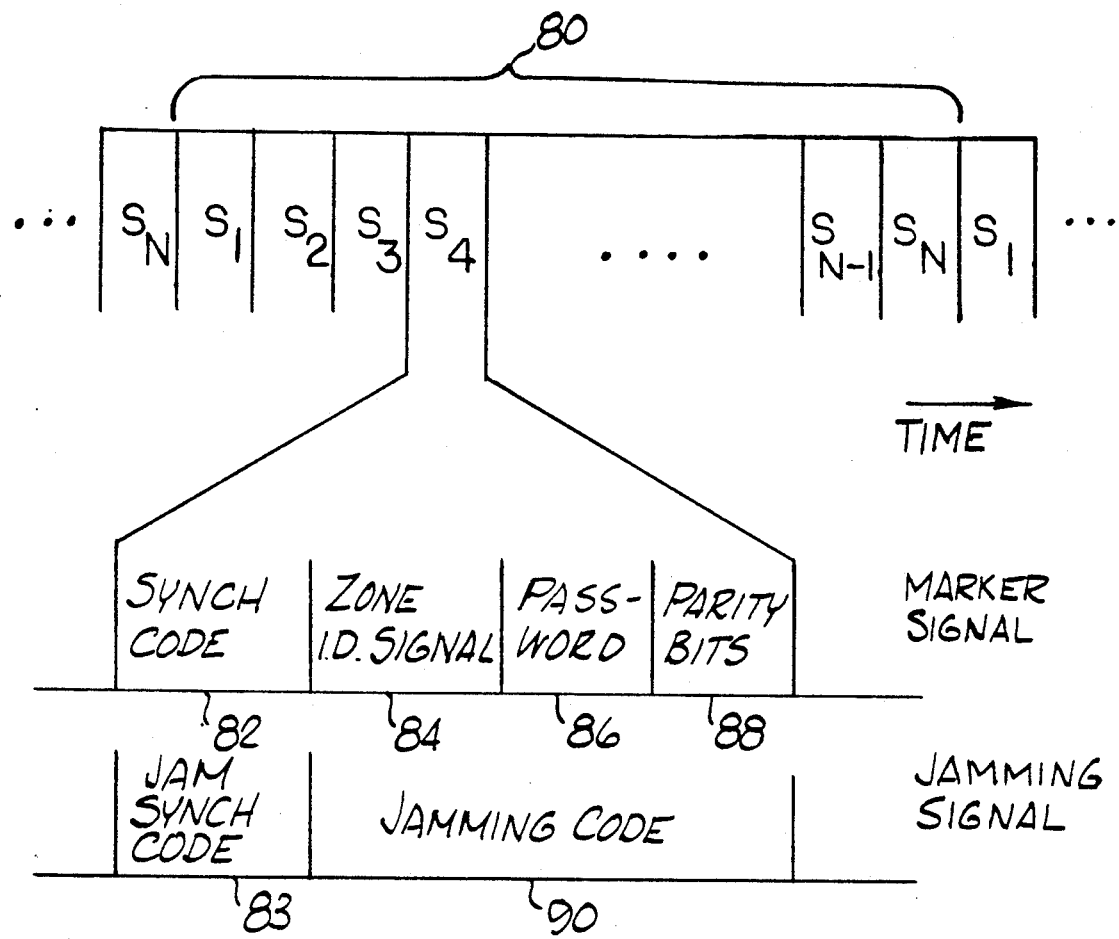
FIG. 5 is a timing diagram showing the structure of a marker signal transmitted by the plurality of marker channel transmitters according to the present invention.

The boundaries of the zones $Z_1$ and $Z_2$ are drawn on a map of the cellular service area according to the marketing needs of the cellular service provider. For example. zone $Z_1$ is defined by the boundary line 68 and zone $Z_2$ is defined by boundary line 70. Each zone within the cellular service area is marked by the marker signal transmitted by each of the marker transmitters. FIG. 4A illustrates a simple example of how a marker transmitter $M_1$ marks the zone $Z_1$ by transmitting a marker signal. As is shown in FIG. 5 and discussed below, the marker signal is divided into a plurality of time slots with each slot marking a particular zone. For example, a time slot $S_1$ may be used to mark the zone $Z_1$ and a time slot $S_2$ may be used to mark zone $Z_2$, etc. The mobile unit 62 having zone $Z_1$ as its primary zone tries to receive the marker signal from marker transmitter $M_1$ in time slot $S_1$. If the mobile unit receives the marker signal that marks zone $Z_1$, then upon call initiation, the mobile unit signals the MTSO (not shown) that it is in its primary zone and the user will be billed accordingly.

Due to the nature of radio frequency propagation, the boundary line 68 of zone $Z_1$ may not exactly coincide with the radio frequency coverage area in which the marker signal transmitted by marker transmitter can be received by the mobile unit. The radio frequency coverage area for marker transmitter $M_1$ is defined by boundary line 72. Thus, the shaded area shown in FIG. 4A represents a bonus area wherein the mobile unit can determine that it is in the zone $Z_1$ but is not actually in the boundary of the zone defined by boundary line 68. As can be appreciated, it is desirable for the cellular service provider to minimize the bonus area for each zone.

Figure 4B:
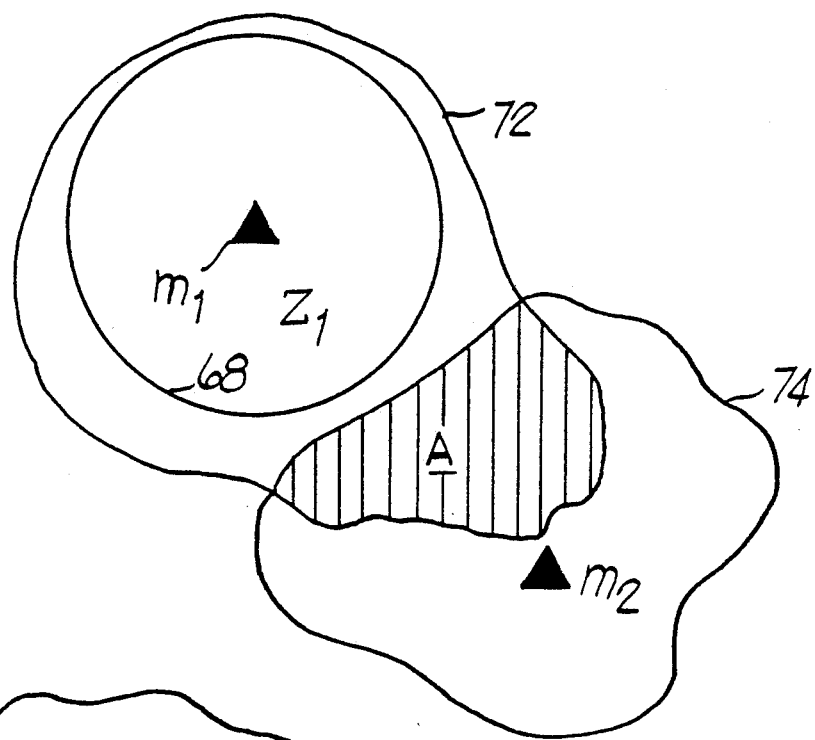

FIG. 4B shows how a second marker transmitter can be used to minimize the bonus area described above. The marker transmitter $M_2$ has a radio frequency coverage area defined by the boundary line 74. If during the time slot when marker $M_1$ is transmitting the marker signals that mark zone $Z_1$, the marker transmitter $M_2$ transmits a jamming signal, then a mobile unit located in shaded region "A" will be less likely to correctly receive the marker signal transmitted from marker transmitter $M_1$. Therefore, the bonus area included within the boundary line 72 has been reduced by the area of the shaded region "A".

Figure 4C:
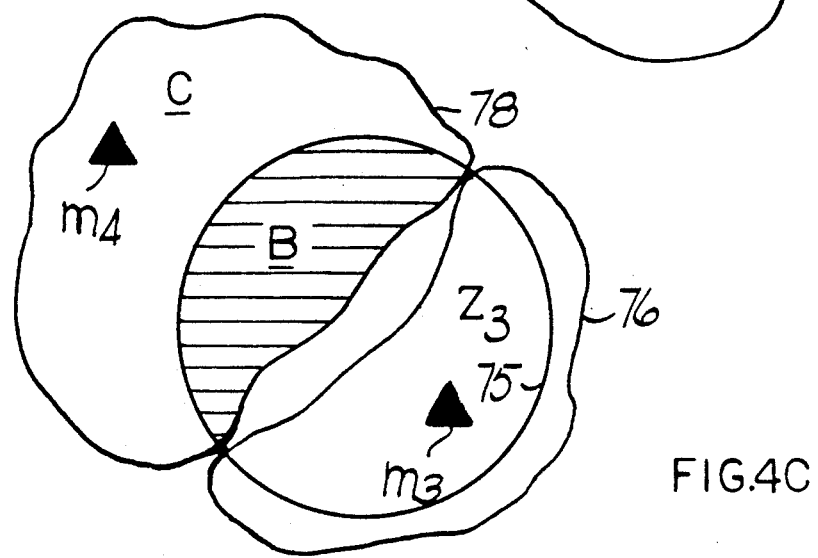

Another problem that occurs when the radio frequency coverage area of a marker transmitter does not coincide with the boundaries of a zone is illustrated in FIG. 4C. Here, a zone $Z_3$ is defined by a boundary line 75. However, a marker transmitter $M_3$ located in the zone has a radio frequency coverage area defined by boundary line 76. As can be seen, the zone $Z_3$ includes a shaded region "B" that is not included in the radio frequency coverage area of marker transmitter $M_3$. If marker transmitter $M_3$ were the only transmitter used to mark zone $Z_3$, a mobile unit located in region "B" would never determine that it is within zone $Z_3$. To solve this problem, another marker transmitter $M_4$ transmits the marker signal for zone $Z_3$ during the same time slot when marker transmitter $M_3$ is transmitting the marker signal that marks zone $Z_3$. Because marker transmitter $M_4$ has a radio frequency coverage area defined by boundary line 78 that includes the region "B", a mobile unit in the region will be able to determine that it is in zone $Z_3$. By using two or more marker transmitters to mark a zone, any holes within a zone where a mobile unit cannot receive the marker signals can be filled. As will be appreciated, using the marker transmitter $M_4$ to mark zone $Z_3$ means that a mobile unit located in a region "C" could determine that it is in zone $Z_3$. However, the region C can be minimized by using the jamming technique described above.

The cellular telephone system according to the present invention combines the use of jamming and using more than one marker transmitter to mark a zone to shape the radio frequency coverage areas of the marker transmitters so they coincide more closely with the boundary of a zone as determined by the cellular service provider. Other techniques to shape a radio frequency coverage area include the use of directional antennas, varying antenna height and location, as well as varying the power level of the marker transmitters, as will be further described below. In the preferred embodiment, the optimal location of the marker transmitters within the cellular service area is determined by using computer models of the radio frequency propagation characteristics of the marker transmitters in the cellular service area, as well as by field testing and adjusting the location of the deployed marker transmitters.

FIG. 5 is a timing diagram showing the structure of a marker signal 80 that is transmitted by the plurality of marker transmitters. In a cellular telephone system that includes many hundreds of mobile units, those mobile units designed to work with the present invention periodically monitor the marker channel to determine if they are in a zone. The marker transmitters sequentially transmit the marker signals that mark the plurality of zones so that a mobile unit should have to monitor the marker channel for a time not longer than the length of the entire marker signal 80 plus one time slot to determine if the mobile unit is in a zone. The marker signal 80 is divided into N time slots $S_1, S_2, S_3, \ldots S_N$. In the preferred embodiment, however, this number is twelve so that a mobile unit should monitor the marker channel for a time period equal to thirteen time slots to determine if it is within a zone. As stated above, each zone within the cellular service area is marked by an appropriate data transmission within one of the twelve time slots.

During each time slot, for example during time slot $S_4$, several individual signals are transmitted. The codes include a synchronize code 82, a zone identification signal 84, a password 86, and a series of parity bits 88. The synchronize code 82 is a predetermined pattern of bits that allows a mobile unit to synchronize itself with the marker signal being transmitted. The synchronize code is transmitted simultaneously at the beginning of each time slot by each marker transmitter that is not operating as a jamming transmitter. Only the marker transmitters that mark a given zone transmit the zone identification signal 84 during a single time slot. For example if marker transmitters $M_1$, $M_2$ and $M_3$ are all used to mark a zone, then only marker transmitters $M_1$, $M_2$ and $M_3$ will transmit the zone identification signal and the password for the zone as well as the parity bits during a particular time slot.

The password 86 is a dynamically changing code that is included to help prevent fraud on the cellular service provider. If an unscrupulous user were to alter his mobile unit so that the unit always signaled the MTSO to indicate the mobile unit was in its primary zone, the user would always be given an "in zone" rate on every call made or received regardless of the mobile unit's location. To prevent this, the marker transmitters transmit a randomly selected password for each zone in the cellular service area. The password is generated by the zone computer, which transmits the new password to both the marker transmitters and a billing computer that interfaces with the MTSO. When a mobile unit is in a zone, it stores the received password. Should the password change, the mobile unit will update its memory accordingly. Upon initiating an in-zone call, the mobile unit transmits the password back to a cell site transceiver which in turn forwards the password to a billing computer interfaced to the MTSO. The password transmitted by the marker transmitter is compared to the password received from the mobile unit. If the passwords are not the same, then the cellular service provider knows that the mobile unit cannot really be in the zone and therefore should not be given the "in-zone" rate. Finally, the series of parity bits 92 are transmitted to allow the mobile unit to detect and correct an error in the marker signal that may have occurred in transmission, as is well known to those skilled in the art of digital communications.

Preferably, the rate at which the individual bits that comprise the marker signal 80 are transmitted is selected to be relatively slow, such as 100 bits/second. The slow data rate allows zone computer 64 to synchronize all the marker transmitters within the cellular service area.

Also shown in FIG. 5 is a timing diagram showing the structure of a jamming signal transmitted by a marker transmitter. As with a marker signal, the jamming signal includes jamming synchronize code 83 and a jamming code 90 that are simultaneously transmitted by all the marker transmitters acting as jammers in a given time slot. The jamming synchronize code is designed to interfere with the synchronize code 82, while the jamming code is designed to interfere with the zone identification signal 84, the password 86 and the parity bits 88 in order to reduce the radio frequency coverage area in which a mobile unit can receive these codes correctly.

In the preferred embodiment, the configuration of the marker signal is such that the time required for N+1 time slots to be transmitted is less than the time interval at which a page signal from a cell cite transceiver is repeated on the forward control channel. In the current AMPS/NAMPS cellular communications protocol, a page signal is transmitted from the cell site transceivers to a mobile unit to alert the mobile unit to an incoming telephone call. This page signal is typically repeated 5 seconds later. In order to minimize the chance of missing a page signal, the mobile units should not monitor the marker channel for more than 5 seconds at a time.

All zones within the cellular service area can be marked with twelve time slots by transmitting more than one zone identification signal during a single time slot. For example some market transmitters could transmit the zone identification signal that marks zone $Z_1$ during time slot $S_1$. Similarly other marker transmitters could transmit the zone identification signal that marks a zone $Z_{30}$ in time slot $S_1$ as long as the radio frequency coverage areas in which the marker signals transmitted by the marker transmitters that mark zones $Z_1$ and $Z_{30}$ do not overlap. With twelve time slots, a single marker transmitter can mark or jam up to twelve different zones. As will be appreciated by those skilled in the art, the number of time slots that comprise the marker signal is easily variable. For example, another way of structuring a marker signal is to choose a longer string of time slots and thereby suffer a reduced possibility of receiving an incoming call, or one may choose to split the marker signal into a plurality of segments with each segment being less than 5 seconds long.

Figure 6:
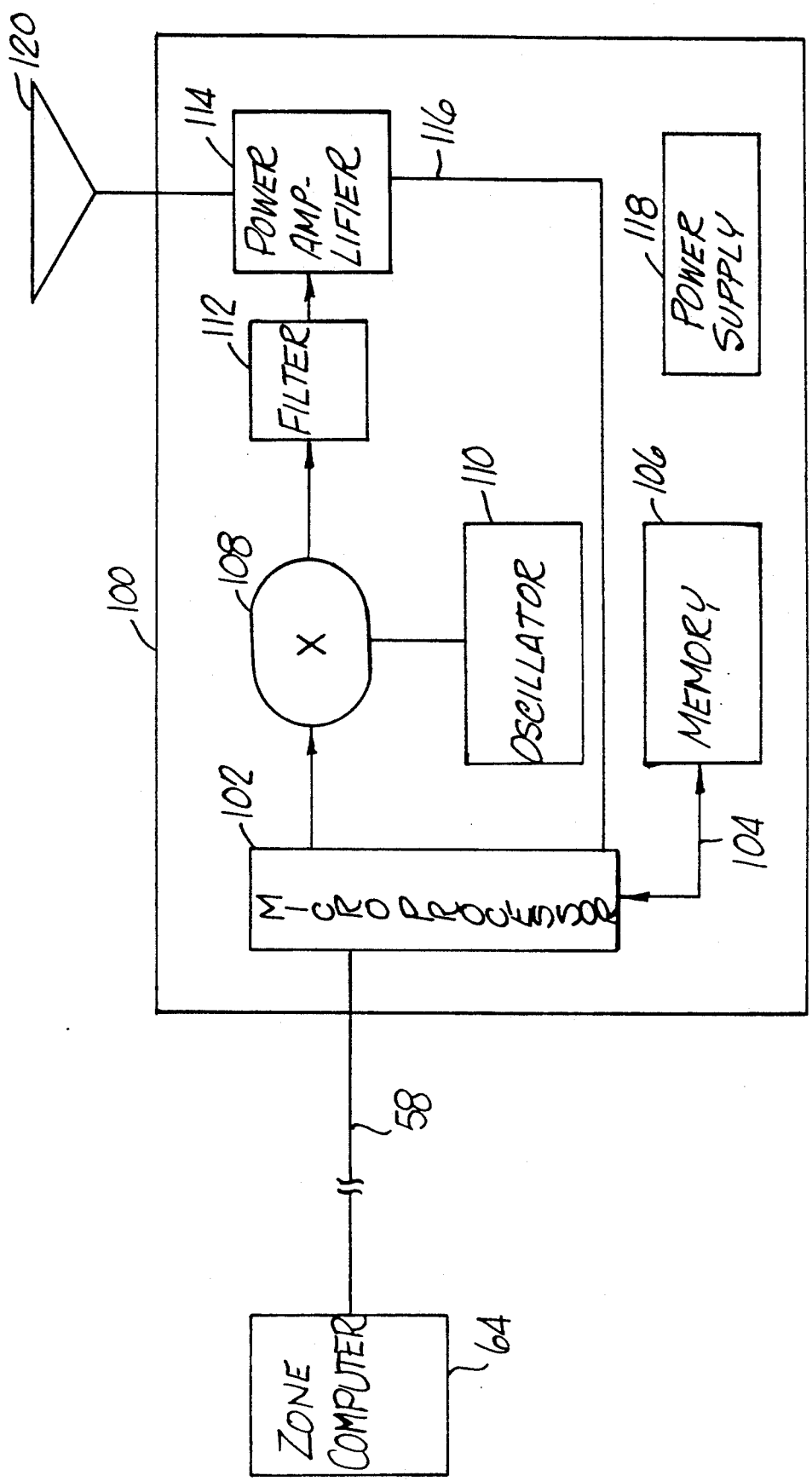
FIG. 6 is a block diagram of a marker channel transmitter according to the present invention.

FIG. 6 is a block diagram of a marker transmitter 100 according to the present invention. The marker transmitter 100 includes a microprocessor 102, a memory 106, a mixer 108, an oscillator 110, a filter 112, a power amplifier 114, a power supply 118 and an antenna 120. The microprocessor 102 is coupled to the zone computer 64 by a communications link 58. Preferably, the communications link 58 is a telephone line, fiber optic cable or microwave link that directly connects the zone computer with the marker transmitter. The memory 106 is connected to the microprocessor 102 by a bus 104. The memory 106 is used to store temporary variables such as the zone identification signals, passwords and power levels, plus a computer program that drives the marker transmitter as will be described below. The microprocessor 102 formats and feeds the marker signal to be transmitted to the mixer 108 where the marker signal modulates an appropriate carrier signal received from an oscillator 110. In the preferred embodiment, the marker signal is Manchester encoded and frequency shift key (FSK) modulated to aid the mobile units in synchronizing themselves to the marker signal. The details of Manchester encoding and frequency shift key modulation are well known in the art and therefore are not discussed here. The modulated carrier signal is transmitted through a filter 112 to a power amplifier 114 and broadcast on an antenna 120. A power supply 118 is included to provide electrical power to the marker transmitter from a commercial AC source and may include a backup battery.

The power at which the marker transmitter transmits the marker signals is controlled by the microprocessor 102. A power control signal is sent to the power amplifier 114 on a path 116. For example, all the zone identification signals may be transmitted at full power while the jamming signals may be transmitted at a variety of power levels in order to shape the size of zone as described above. Thus, a marker transmitter might receive an instruction to transmit a jamming signal during time slot $S_6$ at one-half power and another jamming signal in time slot $S_9$ at one-third power, etc. Zone computer 64 is responsible for coordinating the power levels transmitted by the marker transmitters. This coordination is based on a data base maintained by the zone computer. As described above, the placement of the marker transmitters, the power level at which the zone identification signals and jamming signals are transmitted and the time at which each marker transmitter transmits are defined with the assistance of a computer model of the radio frequency propagation characteristics within the cellular service area as well as by field test data. The data base may be continually updated to refine the shape of the zones and improve the reliability of the system.

Figure 7:
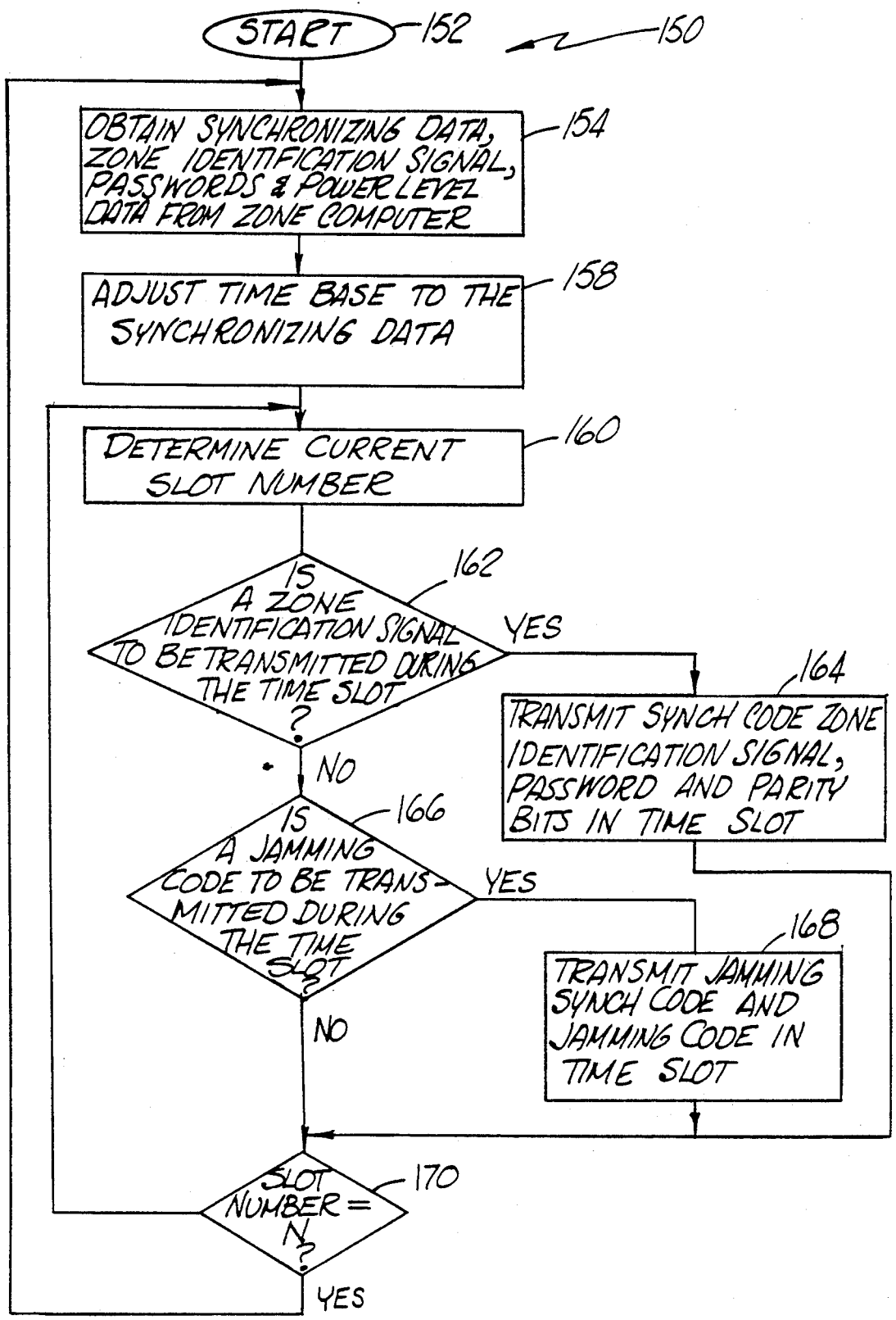
FIG. 7 is a flow chart of a method for programming a marker channel transmitter to mark a zone within a cellular service area according to the present invention.

FIG. 7 is a flow chart of a computer program for operating each marker transmitter to mark one or more zones within a cellular service area. The program 150 begins at a start block 152 and proceeds to a block 154, wherein synchronizing data, zone identification signals, passwords and power level data are obtained from the zone computer. This information tells the marker transmitter what zone identification signals are to be transmitted in what time slot as well as what the current password is for each zone that the marker transmitter marks. The information obtained from the zone computer in block 154 remains valid until the entire marker signal is transmitted. In the preferred embodiment, the zone identification signals are preassigned digital codes that correspond to a unique zone in the cellular service area. At the time a user contracts with the cellular service provider to select a primary and one or more secondary zones, the zone identification signals that correspond to the zones selected are programmed into the mobile unit. If the mobile unit receives a zone identification signal on the marker channel that matches one of the zone identification signals stored in the mobile unit's memory, the mobile unit knows that it is in either the mobile unit's primary or secondary zone.

Once the synchronizing data has been obtained from the zone computer, the program proceeds to a block 158, wherein the time base that controls when the marker transmitter begins transmitting is adjusted according to the synchronize data received from the zone computer. The synchronizing data allows each marker transmitter within the cellular service area to adjust its time base so that it can transmit data simultaneously with the other marker transmitters during a given time slot.

After block 158, the program proceeds to a block 160, wherein the current slot number is determined (i.e., which of the N time slots shown in FIG. 5 is currently being transmitted by the marker transmitters). After block 160, the program proceeds to a decision block 162, wherein the marker transmitter determines if it needs to transmit a zone identification signal during the current time slot. If the answer to decision block 162 is yes, the program proceeds to a block 164 wherein the synchronize code, zone identification signal, password and the parity bits are transmitted during the time slot. The power level at which the signals are transmitted in block 164 are determined by the power level data obtained from the zone computer in block 154.

If the answer to decision block 162 is no, meaning that the marker transmitter did not have to transmit a zone identification signal in the current time slot, the program proceeds to a decision block 166. In decision block 166, the marker transmitter determines if it needs to transmit a jamming code during the current time slot. If the answer to decision block 166 is yes, the program proceeds to a block 168, wherein a jamming sync code and a jamming signal are transmitted at the same time the marker transmitters that mark the particular zone are transmitting the zone identification signals as in block 164. The power level at which the jamming sync code and jamming signal are transmitted is also determined by the power level data obtained from the zone computer in block 154.

If the answer to block 166 is no, or after blocks 164 or 168, the program tests to see if the entire marker signal has been transmitted. In the present preferred embodiment of the marker signal, this is accomplished by determining if the time slot number is equal to twelve. However if more time slots were used, it would be accomplished by checking if the current slot number is equal to the last time slot in the marker signal. If the entire marker signal has not been transmitted, transmitted, the program loops back to block 154. This process of obtaining the information from the zone computer and transmitting the marker signal is carried out continually by the marker transmitters so that a mobile unit may monitor the marker channel at any time and determine whether it is in a zone.

Figure 8:
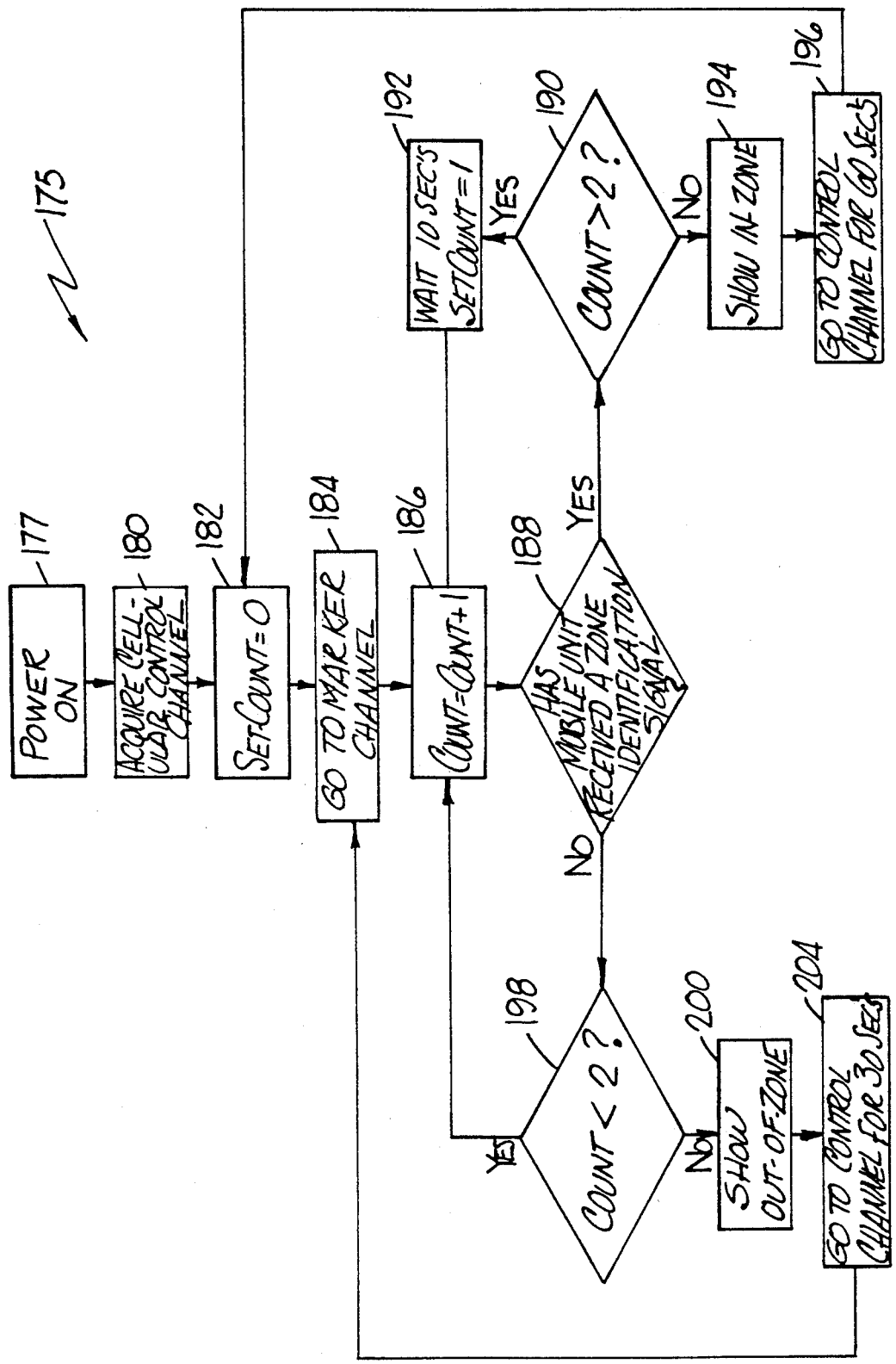
FIG. 8 is a flow chart showing how a mobile telephone unit designed according to the present invention monitors the marker channel to determine whether it is within a zone.

FIG. 8 is a flowchart of a computer program that causes a mobile unit made according to the present invention to determine whether it is within a zone. The program 175 begins when the mobile unit is powered on as shown in block 177. After being powered on, the mobile unit acquires the cellular control channel in a block 180 as is done in standard cellular telephone systems. After acquiring the cellular control channel, the mobile unit sets a variable, Count, to zero in a block 182. The Count variable is a loop counter that keeps track of the number of times in a row the mobile unit has received or been unable to receive a zone identification signal.

After block 182, the mobile acquires the marker channel in a block 184. Next, the Count variable is increased by one in a block 186. After block 186, the mobile unit monitors the marker channel to determine whether the mobile unit has received a zone identification signal that matches a zone identification signal stored within the mobile unit's internal memory. If the mobile unit has not received a zone identification signal, the mobile unit determines if the Count variable is less than two in a block 198. If the answer to block 198 is yes, the program loops back to block 186, where the Count variable is increased. If the answer to block 198 is no, the user of the mobile unit is shown that the mobile unit is "out of zone," in a block 200. After block 200, the mobile unit monitors the cellular control channel for 30 seconds (block 204) before returning to the marker channel at block 184. Thus, a mobile unit that cannot receive a zone identification signal will continue to monitor the marker channel every 30 seconds until a zone identification signal is received or until a call is initiated.

If the mobile unit has received a zone identification signal that matches a zone identification signal stored in the unit's memory, the program branches from block 186 to block 190. In block 190, it is determined if the variable, Count, is greater than two. If Count is not greater than two, the program proceeds to block 194 and the user is provided with an indication that the mobile unit is "in zone". After block 194, the mobile unit monitors the control channel for 60 seconds in a block 196. After the 60 seconds, if the mobile unit has not initiated a call or received a page signal, the mobile unit returns to the marker channel to confirm that it is still in a zone. If the answer to block 190 is no, the program proceeds to a block 192 where the mobile unit waits 10 seconds and sets the Count variable back to one. The program then proceeds to block 186 before monitoring the marker channel for another zone identification signal to be received.

Figure 9:
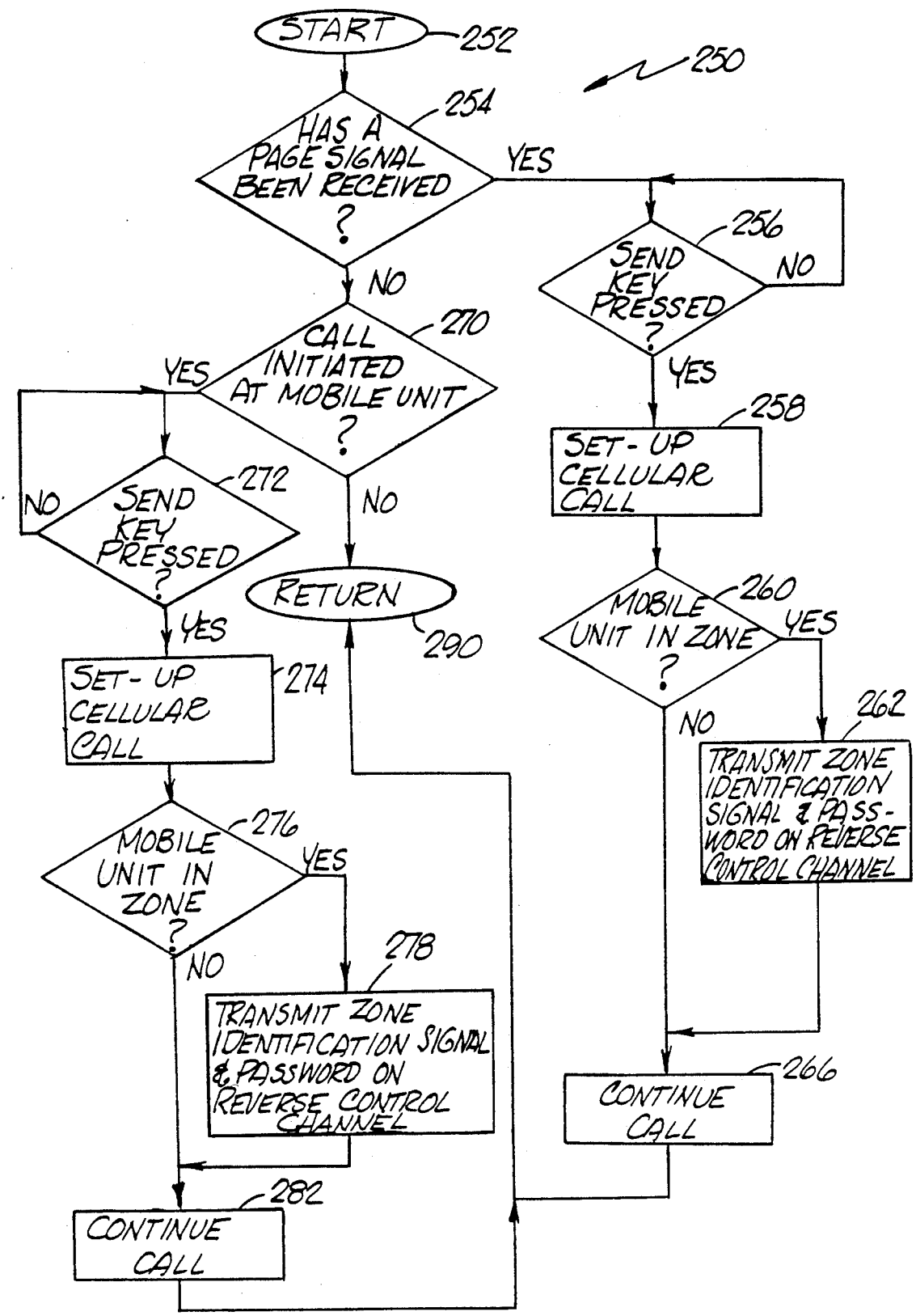
FIG. 9 is a flow chart of a method for programming a mobile telephone unit to send a signal to a mobile telephone switching office that indicates whether the mobile unit is within a zone according to the present invention.

Thus, when the mobile unit is in the idle state, it periodically leaves the control channel to monitor the marker channel in order to receive a zone identification signal. The presence or absence of a zone identification signal allows the mobile unit to alert the user whether the mobile unit is within a zone. If, during the idle state, the mobile unit receives a page signal or initiates a call, an interrupt program is called that processes the call and sends a signal to the cellular system that indicates whether the mobile unit is in or out of a zone. FIG. 9 is a flowchart that shows the steps of the interrupt program 250 that is called when a page signal is received or a call is initiated at the mobile unit.

The program 250 begins at a start block 252 and proceeds to a decision block 254, where it is determined if the mobile unit has received a page signal. If the mobile unit has received a page signal, then the program proceeds to a decision block 256. Decision block 256 waits until the operator has pressed the "send key" indicating that the operator wants to receive the telephone call. Once the send key has been pressed, the program proceeds to set up the cellular call as is done in a standard cellular telephone system in a block 258. After the call has been set up, the program proceeds to a decision block 260, that tests whether the mobile unit has detected it is within a zone. If the mobile unit has detected it is within a zone, the mobile unit transmits the received zone identification signal and the password for the zone to a cell site receiver on the reverse control channel in a block 262. Additionally, the mobile unit may transmit the "zone-type code" that indicates whether the mobile unit is within its primary, secondary or a public-type zone in the block 262. After transmitting the signal that indicates to the cellular system whether the mobile unit is in a zone, the cellular call is continued in the standard way in a block 266. If no signal is received by the cellular system, it is assumed that the mobile unit is not within a zone. After the call is completed, the program returns in a block 290.

If the mobile unit has not received a page signal but has initiated a call, the program proceeds to block 272 that polls the status of the send key. When the operator presses the send key, the program proceeds to a block 274 where the call initiated by the mobile unit is set up. After block 274, the program proceeds to a decision block 267 that determines if the mobile unit has detected it is within a zone. If the mobile unit is within a zone, the zone identification signal and password are transmitted on the reverse control channel in a block 278. Again, the mobile unit may transmit a "zone type code" as described above. The cellular call is then continued in a block 282. After the call has been completed, the program returns in a block 290.

As can be seen from the above description, the normal operation of the mobile unit is not affected by the present invention, with the exception of briefly monitoring the marker channel to determine if it is within a zone. The signals transmitted from the mobile unit to a cellular system in blocks 262 and 278 described above are accomplished when the user presses a "send" key on the mobile unit. These signals are transmitted on the standard reverse control channel that exists between the mobile unit and the cell site transceivers deployed within the cellular service area. In the current AMPS/NAMPS cellular telephone protocol, there are some unused time slots during which the signals are transmitted. The zone identification signal and password are received by the cell site transceivers and forwarded to the mobile telephone switching office where the rate charged to the user for the call is adjusted based on his location within the cellular service area.

Figure 10:
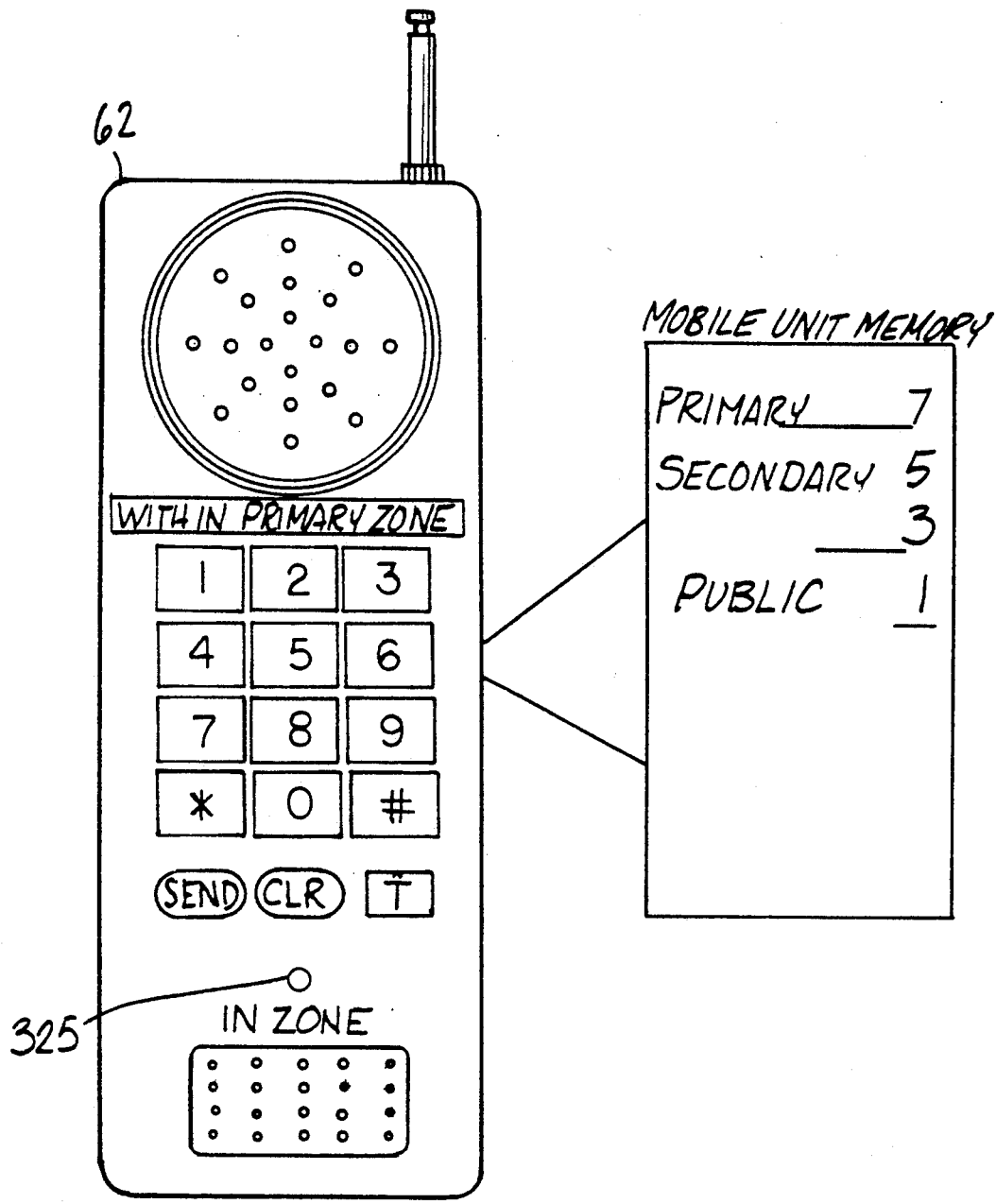
FIG. 10 is a pictorial representation of a mobile telephone unit according to the present invention that includes means for indicating whether the mobile unit is within a zone.

A handset of a mobile unit according to the present invention is shown in FIG. 10. The handset includes an LED 325 that indicates to the user whether the mobile unit is located in zone. The LED is illuminated when the mobile unit detects that it is within a zone. In this way, a user knows whether a discount will be given on a call made or received from the mobile unit's present location. A liquid crystal display 328 is programmed to display whether the mobile unit is in its primary, secondary or a public-type zone.

Also shown in FIG. 10 is a depiction of some of the variables stored within the mobile unit's memory. For example, the mobile unit shown in FIG. 10 has zone number 7 selected as its primary zone. Zones 3 and 5 have been selected as the unit's secondary zones. Similarly, the mobile unit has zone 1 stored as the public zone. The zone identification signals stored within the mobile unit's memory are compared to the zone identification signals received from the marker transmitters. If a zone identification signal is received that corresponds to the zone identification signal for zone number 7, then the mobile unit knows it is within its primary zone. Similarly, if a zone identification signal that corresponds to zone number 27 is received, then the mobile unit knows it is within a public zone. The type of zone in which the mobile unit is located is displayed to the user using the three light-emitting diodes 325 as described above. Other indicators on the mobile unit may be used to display the type of zone.

Figure 11:
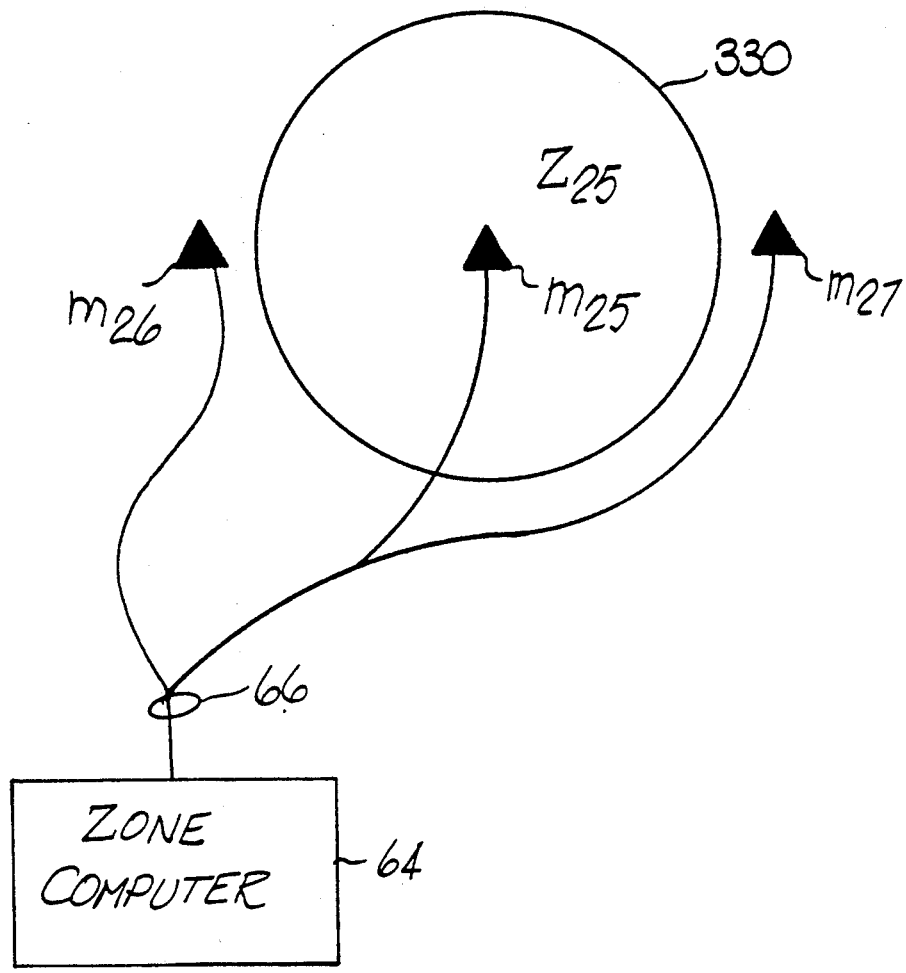
FIG. 11 is a diagram that illustrates how a pair of marker channel transmitters can be dynamically programmed to mark a zone in the event a marker channel transmitter fails.

FIG. 11 is a diagram of a zone that illustrates how the marker transmitter can be dynamically reconfigured according to the present invention. In this example, a zone $Z_{25}$ is shown having included therein a marker transmitter $M_{25}$. The marker transmitter $M_{25}$ transmits the marker signals that mark zone $Z_{25}$. The boundaries of zone $Z_{25}$ are defined by a boundary line 330. Outside the boundary of zone $Z_{25}$ are two other marker transmitters $M_{26}$ and $M_{27}$. These marker transmitters are used to mark and jam neighboring zones as described above. If the marker transmitter $M_{25}$ were to fail, then a user located within zone $Z_{25}$ would not be able to receive a discount on calls made or received within the zone. However, the zone computer 64 can instruct the marker transmitters $M_{26}$ and $M_{27}$ to simultaneously transmit the zone identification signal for zone $Z_{25}$ so that a mobile unit will be able to detect that it is within the zone, presuming that the radio frequency coverage areas of marker transmitters $M_{26}$ and $M_{27}$ cover the boundaries of zone $Z_{25}$. The particular zone identification signals transmitted by a marker transmitter can be altered by changing the information sent from the zone computer to the marker transmitters in block 154 shown in FIG. 7. Which marker transmitter $M_{26}$ or $M_{27}$ is needed to mark the zone is determined by the data base of radio frequency propagation characteristics that is maintained within the zone computer 64. As described above, this data base is continually updated and improved so that a failure of one marker transmitter does not result in a degradation of service to the cellular customers.

While the preferred embodiment of the invention has been illustrated and described, it will be appreciated that various changes can be made therein without departing from the spirit and scope of the invention. For example, it is not necessary that all the marker transmitters operate in simulcast. Instead, each marker transmitter could sequentially transmit its zone identification signal as well as passwords to be received by the mobile units. Therefore it is intended that the scope of the present invention be determined solely from the following claims.

What is claimed is:

1. A method for marking a predefined zone independent of a cellular telephone system and for determining if a mobile unit is located within the predefined zone, said cellular telephone system including a cell site transceiver that transmits and receives signals to and from a mobile unit on one or more control channels in a cell site, the method comprising the steps of:

transmitting a zone identification signal on a marker channel that identifies said predefined zone said zone identification signal being transmitted from a first marker transmitter having a radio frequency coverage area that includes at least part of the cell site;

shaping the radio frequency coverage area of the first marker transmitter so that said zone identification signal can be received by said mobile unit in an area that substantially corresponds to the boundaries of said predefined zone said step of shaping including transmitting a jamming signal from a second marker transmitter at substantially the same time as said zone identification signal is being transmitted from said first marker transmitter to thereby reduce or enlarge the radio frequency coverage area in which the zone identification signal can be received by said mobile unit;

monitoring said marker channel at said mobile unit; and detecting said zone identification signal at said mobile unit.

2. The method of claim 1, wherein the marker channel on which the zone identification signal is transmitted is separate from the control channels used by the cell site transceivers.

3. The method of claim 1, wherein the step of shaping the radio frequency coverage area of the marker transmitter further comprises the step of:

transmitting the zone identification signal from a plurality of marker transmitters at substantially the same time, to thereby increase the area in which the zone identification signal can be received by the mobile unit.

4. The method of claim 1, further comprising the step of:

transmitting a plurality of zone identification signals from a plurality of marker transmitters to mark a plurality of zones within an area serviced by the cellular telephone system.

5. The method of claim 4, wherein the plurality of marker transmitters sequentially transmit a marker signal that includes the plurality of zone identification signals.

6. The method of claim 5, further comprising;

dividing the marker signal into a plurality of time slots, wherein each zone identification signal that identifies a zone is transmitted during one of the time slots.

7. The method of claim 5, wherein the step of shaping the radio frequency coverage area of the marker transmitter further comprises the step of:

synchronizing the plurality of marker transmitters to transmit a zone identification signal during a single time slot to increase the area in which the zone identification signal can be received by the mobile unit.

8. The method of claim 6, wherein the step of shaping the radio frequency coverage area of the marker transmitter further comprises the step of:

synchronizing a second marker transmitter to simultaneously transmit a jamming signal during a time slot when a zone identification signal is being transmitted from the first mentioned marker transmitter to thereby reduce the area in which the zone identification signal can be received by the mobile unit.

9. The method of claim 1, further comprising the step of:

varying the power at which said first marker transmitter transmits the zone identification signal to shape the marker transmitter's radio frequency coverage area.

10. The method of claim 1 further comprising the step of:

varying the power at which said second marker transmitter transmits the jamming signal to vary the amount of reduction in the area in which the zone identification signal can be received by the mobile unit.

11. The method of claim 6, further comprising the step of:

transmitting a synchronize code at the beginning of each time slot.

12. The method of claim 4, further comprising the steps of:
assigning a password to correspond to each of the plurality of zones;
transmitting each of the passwords within the zone to which the password corresponds; and
monitoring the marker channel at the mobile unit to detect a password and transmitting the detected password from the mobile unit to a mobile telephone switching office, wherein the mobile telephone switching office analyzes the password received from the mobile unit to determine if the mobile unit is within the zone to which the password corresponds.

13. The method of claim 2, wherein the marker channel is a cellular traffic channel normally allocated to said cell site transceiver.

14. The method of claim 1, wherein the signal transmitted from the mobile unit that indicates the mobile unit is within the zone is transmitted on a reverse control channel that exists between the mobile unit and said cell site transceiver.

15. The method of claim 14, wherein the step of transmitting the signal from the mobile unit is performed after a user of the mobile unit has activated a send button on the mobile unit.

16. The method of claim 1 further comprising, after said step of detecting, the steps of:
comparing the detected zone identification signal with a digital code stored in the mobile unit; and
transmitting a signal that indicates the mobile unit is within the zone if the received zone identification signal corresponds to the stored digital code.

17. The method of claim 4, further comprising the step of:
transmitting information from a zone computer to each of the plurality of marker transmitters, the information indicating the time at which the zone identification signals are to be transmitted by each of the plurality of marker transmitters.

18. The method of claim 17, wherein the information transmitted from the zone computer includes a password that is to be transmitted for each zone and a power level at which the markers transmitters are to transmit the marker signals.

19. The method of claim 6, further comprising the step of:
transmitting more than one zone identification signal during a single time slot from more than one marker transmitter, provided that the radio frequency coverage areas of the marker transmitters do not overlap.

20. The method of claim 4, further comprising the step of:
monitoring the plurality of marker transmitters for a failure and, in the event a marker transmitter fails, transmitting a zone identification signal from at least one marker transmitter having a radio frequency coverage area that overlaps the radio frequency coverage area of the failed marker transmitter.

21. The method of claim 1, further comprising the step of:
providing an indication to a user of the mobile unit whether the mobile unit has received the zone identification signal that corresponds to the predefined zone.

22. A zone marker system for use in marking a zone within one or more cell sites of a cellular telephone system that includes a cell site transceiver that transmits and receives signals to and from a mobile telephone unit on one or more control channels in order to provide cellular telephone service within a cell site coverage area, the zone marker system comprising:
a first marker transmitter for transmitting a zone identification signal on a marker channel wherein the first marker transmitter transmits the zone identification signal in a radio frequency coverage area that includes at least part of the cell site;
means for shaping the radio frequency coverage area of the marker transmitter substantially correspond to the boundaries of the zone said shaping means including means for synchronizing a second marker transmitter to simultaneously transmit a jamming signal when a zone identification signal is being transmitted from a first marker transmitter, to thereby reduce or enlarge the radio frequency coverage area in which the zone identification signal can be received by the mobile unit; and
means associated with said first marker transmitter for a receiving a signal from said mobile unit that indicates whether the mobile unit has received the zone identification signal.

23. The zone marker system as in claim 22, wherein the mobile unit includes means for comparing one or more received zone identification signals with a stored zone identification signal in said mobile unit such that said mobile unit may determine if the received zone identification signal corresponds to the stored zone identification signal.

24. The zone marker system as in claim 22, wherein a plurality of marker transmitters transmit a marker signal that includes the plurality of zone identification signals.

25. The zone marker system as in claim 24, wherein each zone identification signal that identifies a zone is transmitted during one of the time slots on said marker channel.

26. The zone marker system as in claim 22, wherein the means for shaping the radio frequency coverage area further comprises:
a zone computer coupled to each of the marker transmitters, the zone computer operating to synchronize the plurality of marker transmitters to transmit a zone identification signal during a single time slot to increase the radio frequency coverage area in which the zone identification signal can be received by the mobile unit.

27. The zone marker system as in claim 25, wherein the plurality of marker transmitters each include:
means for receiving a power level signal from the zone computer that indicates the power level at which the zone identification signals and jamming signals are to be transmitted by the marker transmitter; and
a variable power transmitter that varies the power at which a marker transmitter transmits the zone identification signals and jamming signals in response to the power level signal.

28. The zone marker system as in claim 22, wherein said marker channel is a voice channel that is allocated from the cell site transceivers.

29. A mobile unit for use in a cellular telephone system that includes one or more cell site transceivers that transmit signals to and receives signals from the mobile unit on one or more control channels, and a zone marker system that includes a first and a second marker transmitter said first marker transmitter transmitting a zone identification signal on a marker channel in a radio frequency coverage area including at least part of a cell site, said radio frequency coverage area identifying a zone and said second marker transmitter transmitting a jamming signal at the same time as said zone identification signal to thereby reduce or enlarge the radio frequency coverage area, the mobile unit comprising:

means for monitoring the marker channel to detect the zone identification signal; in said radio frequency coverage area and means for transmitting a signal that indicates the mobile unit is within the zone if the zone identification signal is detected by the mobile unit.

30. The mobile unit as in claim 29, further comprising:
storage means for storing one or more zone identification signals; and
means for comparing a detected zone identification signal with the one or more stored zone identification signals, wherein the mobile unit transmits the signal that indicates the mobile unit is within the zone if the detected zone identification signal corresponds to one of the stored zone identification signals.

31. The mobile unit as in claim 29, further comprising:
means for indicating to a user of the mobile unit whether the mobile unit is within a zone.

32. The mobile unit as in claim 31, wherein the means for indicating to the user of the mobile unit whether the mobile unit is within a zone comprises a light-emitting diode.

33. The mobile unit as in claim 29, wherein the signal that indicates the mobile unit is within the zone is transmitted to a cell site transceiver on a reverse control channel that exists between the mobile unit and the cell site transceiver.

34. The mobile unit as in claim 29, wherein the marker channel is a voice channel that is allocated from a cell site transceiver.

* * * * *